April 22, 1930.  C. R. FAGLEY  1,755,918
CONVERTIBLE UTENSIL
Filed Aug. 5, 1929  4 Sheets-Sheet 2
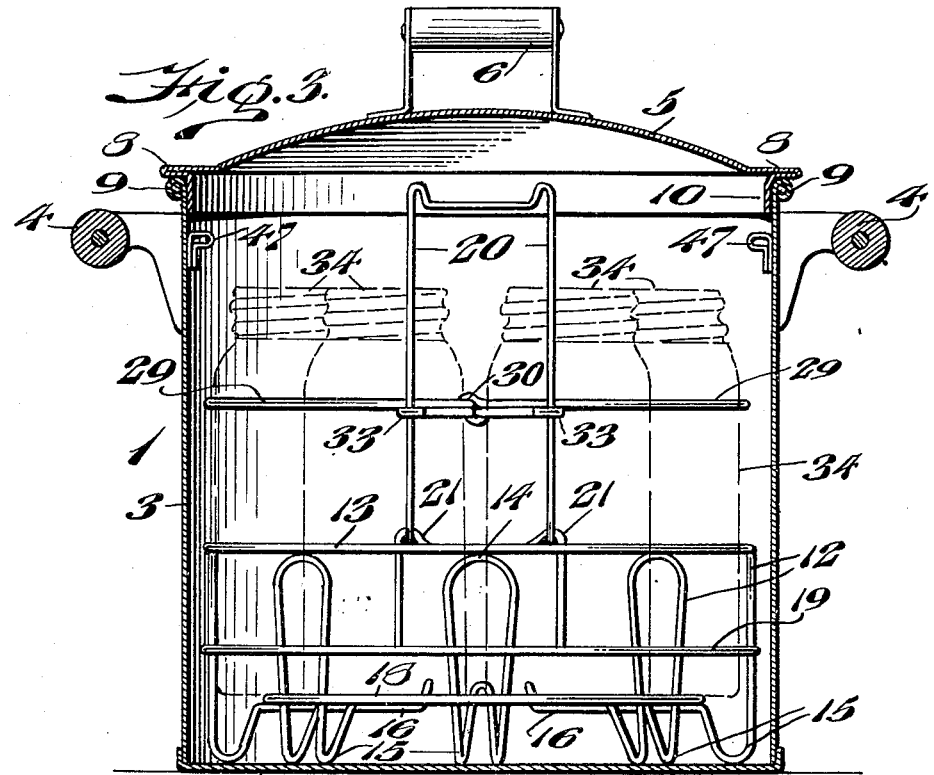
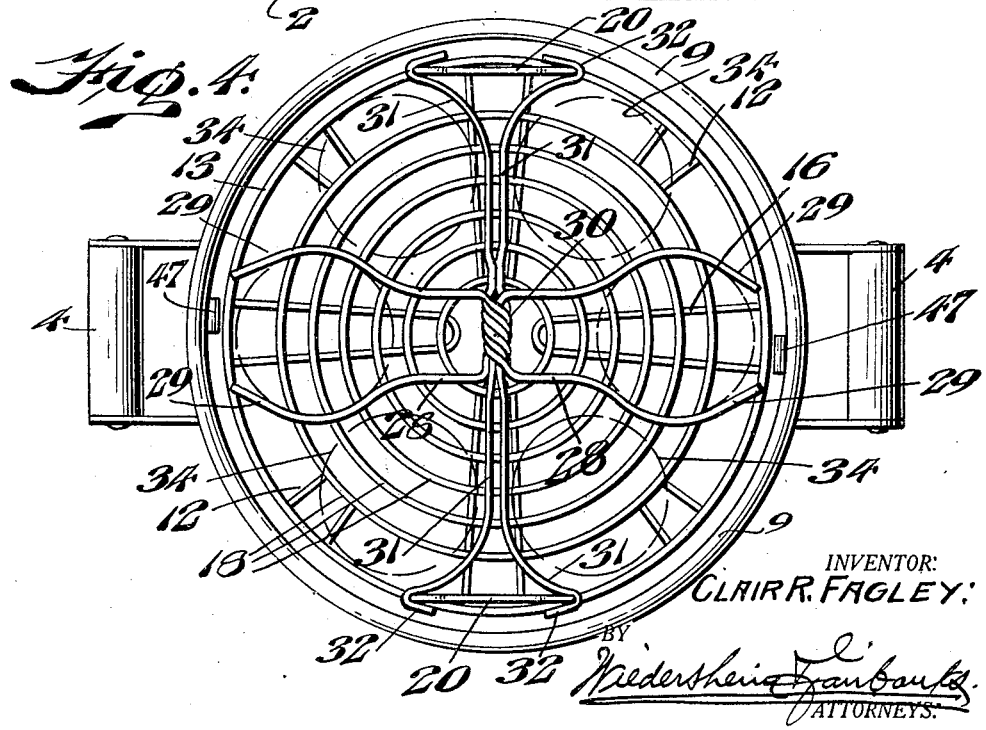
INVENTOR:
CLAIR R. FAGLEY

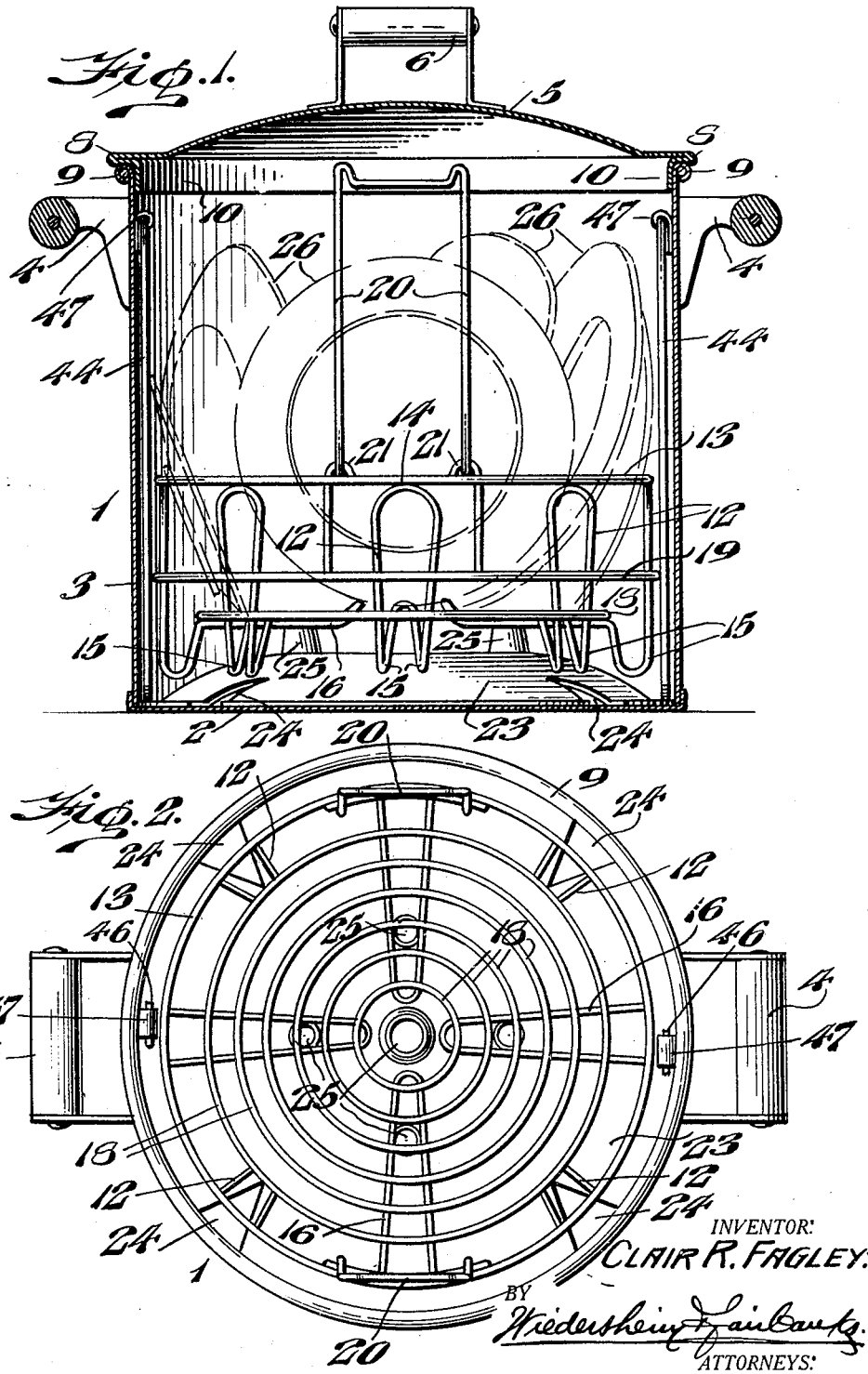

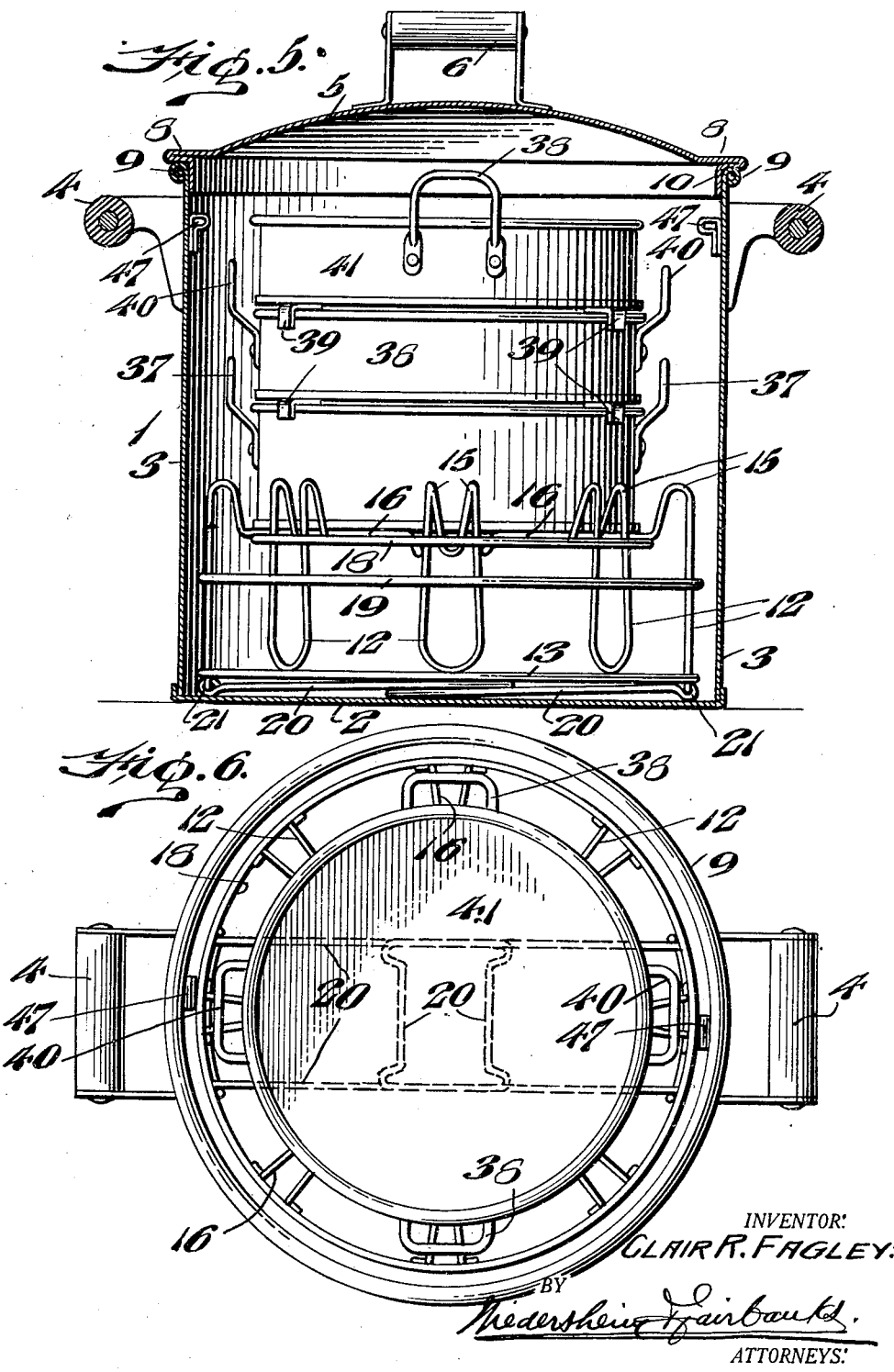

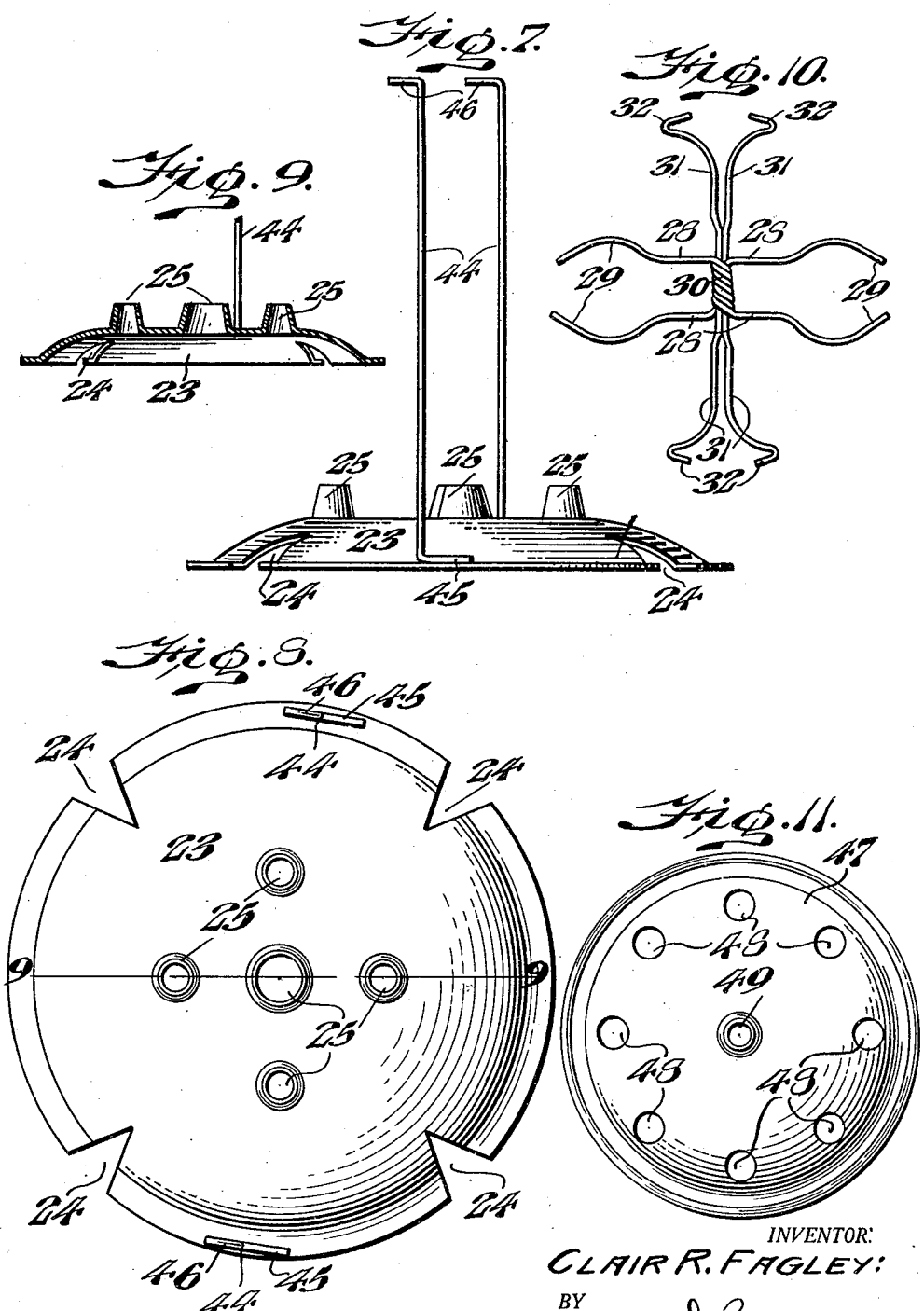

Patented Apr. 22, 1930

1,755,918

UNITED STATES PATENT OFFICE

CLAIR R. FAGLEY, OF PHILADELPHIA, PENNSYLVANIA

CONVERTIBLE UTENSIL

Application filed August 5, 1929. Serial No. 383,614.

My invention relates to a new and useful convertible utensil which may be easily and quickly transformed and adapted for different uses and purposes, and it relates more particularly to a household utensil which can be converted and adapted for use as a dish washer, steam cooker and canner, without any special skill, effort, or labor, the transformation of my utensil, from one form and purpose to another, being effected by the addition, omission, or transposition of parts thereof, all of which can be done instantaneously and without permanently affecting the utility of my utensil or detracting from its value and practicability.

Under modern crowded housing conditions which prevail in large centers of population, the saving of space is an acute problem, and the provision of compact instrumentalities for the doing of household work is a pressing necessity, since in the apartment house type of kitchen, for instance, it is often impossible to find storage space for all the various kitchen utensils which are necessary for housekeeping, especially in view of the fact that most of the work heretofore done by hand is at the present time done by automatic machinery.

It is therefore the object of my invention to provide a convertible utensil which may be used for three different purposes, thus replacing three different machines or utensils, and thereby effecting considerable economy in the storage space consumed and in the handling and transportation of household goods when occasion arises.

To the above ends, my invention consists of the various novel features of construction and advantage illustrated in the accompanying drawings, and hereinafter described and claimed.

For the purpose of illustrating my invention I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings:

Fig. 1, represents a vertical sectional view of a convertible utensil embodying my novel construction, shown adapted for use as a dishwasher, certain parts being shown in elevation.

Fig. 2, represents a plan view of Fig. 1 with the cover removed.

Fig. 3, represents a view similar to Fig. 1 showing my novel construction adapted for use as a canner.

Fig. 4, represents a plan view of Fig. 3 with the cover removed.

Fig. 5, represents a view similar to Figs. 1 and 3 showing my novel construction adapted for use as a steam cooker.

Fig. 6, represents a plan view of Fig. 5 with the cover removed.

Fig. 7, represents a perspective view of certain parts shown in Fig. 1.

Fig. 8, represents a plan view of Fig. 7.

Fig. 9, represents a section on line 9—9, Fig. 8.

Fig. 10, represents a plan view of certain parts shown in Fig. 3.

Fig. 11, represents a plan view similar to Fig. 8 showing a modified construction.

Referring to the drawings, in which like reference characters indicate like parts, Fig. 1 illustrates a convertible utensil embodying my invention shown adapted for use as a dishwasher, and comprising a container or boiler 1 formed of the bottom 2, the annular wall 3, having the handles 4, and provided with a cover 5 having the handle 6. The cover 5 is provided with a horizontal, annular flange 8, which seats upon the bead 9, and with the vertical flange 10, which seats within the upper rim of the annular wall 3, as will be understood from Figs. 1, 3, and 5. Within the container or boiler 1 is positioned a wire basket composed of the vertical legs 12, the upper ends of which are soldered or otherwise secured to the annular member or ring 13, as at 14, and the lower ends 15 of which are deflected upwardly and inwardly to form the horizontal braces 16 which are suitably secured to the series of concentric rings 18 which form a bottom for said wire basket, as will be understood from Figs. 1 and 2. A wire brace 19 may be employed, if desired, for the purpose of reinforcing the construction. 20 designates a pair of handles hinged to the upper ring 13 at 21, whereby the wire basket as a unit may be lowered into and withdrawn from the container 1 when the cover 5 is removed. The lower ends 15 of the legs 12 of the wire basket rest upon the false bottom 23, which is provided with peripheral slots or cut-away portions 24 and with the vertical teats or nipples 25. The false bottom 23 is of a generally convexed or dome-like shape and in conjunction with the legs 12 of the wire basket serves to raise the bottom of the latter to a suitable distance above the bottom 2 of the boiler 1. 26 designates dishes or other ware to be washed, which are positioned within the wire basket (see Fig. 1) in spaced relation to the bottom of the boiler. In this construction water is introduced into the boiler to about the top of the dishes and suitable heat is applied. This results in jets of steam and hot water being forced through the nipples 25 and the slots 24, upwardly against the dishes 26 thoroughly to cleanse said dishes, while the hot, dry steam which permeates the inside of the pot 1 serves to sterilize the dishes. When the dishes have been thoroughly washed and sterilized, the cover 5 is removed by the handle 6 and the wire basket carrying the dishes is withdrawn by means of the handles 20 for the purposes of rinsing and drying.

When it is desired to use my novel convertible utensil as a canner, it is merely necessary to add to the wire basket shown in Fig. 1, the wire frame illustrated in Fig. 10, which is composed of the spring arms 28 which are bulged at 29, and which are intertwined at 30 with the arms 31 which terminate in the hooks 32. The hooks 32 are adapted to engage the handles 20 at 33 (see Fig. 3) at any desired height, and the jars or cans 34 are then positioned in the wire basket with the tops thereof projected upwardly between and being spaced by the spring arms 29 and 31, so that six such jars 34 are positioned in the wire basket simultaneously and are firmly held in position and prevented from impact against each other to guard against breakage. In this construction the false bottom 23 (shown in Fig. 1) may be dispensed with if so desired or may be employed at will.

When it is desired to use my novel convertible utensil as a steam cooker, it is merely necessary to invert the wire basket shown in Fig. 1, with the handles 20 thereof folded thereunder, and to position on the concentric rings 16 and the braces 18 (which form the bottom of the inverted basket) the lowermost pan 36 which is prevented from slipping or displacement by the bottom ends 15 of the inverted legs 12. The bottom pan 36 is provided with handles 37 and serves to support the intermediate pan 38, which is provided with the bottom lugs 39 which engage the upper rim of the bottom pan 36. The intermediate pan 38 in turn is provided with handles 40 and serves to support the upper pan 41 which is similarly maintained in place by the bottom lug 39 and has handles 37. In this construction water is introduced into the bottom of the pot 1 and the edibles in the pans 36, 38, and 41 are cooked by the effect of the steam generated within said pot without direct contact with the source of heat.

Referring again to Figs. 1 and 7, I have illustrated the false bottom 23 as being provided with the vertical rods 44 which are suitably secured to said bottom at 45 and which have the upper deflected ends 46 which are adapted to engage the eyes or apertured lugs 47 in the inner surface of the annular wall 3 of the pot 1, for the purpose of preventing the raising or disturbance of the false bottom 23 by the force of the steam generated thereunder so that said steam may be forcibly ejected through the nipples or teats 25 against the dishes 26 to insure thorough cleansing thereof.

In Fig. 11 I have shown a modified form of the false bottom 47 which is provided with the peripheral ports 48 and with the central nipple or teat 49, the slots or cut-away portions 24 shown in Figs. 1, 7, 8, and 9 being omitted, it being understood that the false bottom 47 shown in Fig. 11 may be provided with the retaining rods 44 if so desired.

It will thus be seen that I have devised a novel, convertible utensil which serves as a dishwasher, canner, and steam cooker, and that to transform said utensil from a dishwasher (see Fig. 1) to a canner (see Fig. 2) it is merely necessary to add the wire frame or brace illustrated in Fig. 10, with or without the use of the false bottom 23 (see Fig. 3). Similarly, to convert my novel utensil from a dishwasher to a steam cooker, the wire brace shown in Fig. 10 and employed in Fig. 3 is omitted and the wire basket is inverted to form a support for the pans 36, 38, and 41 without the necessity of a false bottom 23.

It will further be seen that I have devised a novel utensil which is extremely wieldy and compact and one which is easy to clean, and hence sanitary. My novel utensil being of a simple construction is inexpensive to produce and is not subject to the disadvantages prevalent in more complicated devices.

It will be evident from the foregoing that my novel water boiling holding vessel or container may be constructed in round, oval, oblong or square and provided with a suitable cover and when used as a dish washer the false bottom, which may be of a cone, dome or pyramid design is to be placed in the bottom of the boiler. This false bottom has any number of round holes or openings around its edge or close to the edge and the holes at or near the center of the false bottom when provided with the short tubes or nipples serve to direct and supply greater force to the boiling water passing upwardly through them. These short tubes can be either straight or tapered and the false bottom can be laid in loose or it can be so constructed that it is removably fastened to the inside of the boiler. When washing dishes the same are placed loose in the wire basket or means can be provided to support the plates in a perpendicular or upright position and separate from one another to permit a clear free circulation of the water between the dishes. When the device is used as a steam cooker the false bottom is removed from the boiler if desired and the wire basket is placed in the bottom of the boiler inverted so that its bottom forms a skeleton support for the placing of any form of vessels or containers for food which will be steam cooked by the steam from the boiling water. When the wire basket is used in its regular position for supporting fruit jars containing fruit, vegetables or other edibles, the boiling water will steam cook the food or as it is more commonly termed "cold pack" method of canning and preserving the food or edibles may be employed.

It will be understood that my novel device can be constructed of any suitable metal and that the design or shape of the holes and short tubes in the false bottom can be changed or varied according to requirements. I have found from practical experiments that the employment of the short tubes projecting upwardly from the false bottom causes the circulating water to be forced through the holes and said short tubes extending from said holes at the apex or top of the false bottom so as to produce a very much greater force and circulation in the water contained in the boiler.

These holes and short tubes or upward extending nipples, can be one, two, three, four, five or more in number, depending upon the force desired to project the water and steam passing through these tubes or nipples.

In the producing of a long oval or oblong shaped boiler for this use and purpose, two or a greater number of dome, cone or pyramid shaped false bottoms can be used with each having same manner and form of construction of holes or slots around the edges with one or more short tubes or upwardly extending nipples from the centrally located top of the false bottom. A series of smaller dimension domes with same principle of construction could also be applied in a large round or square shaped boiler for this same use and purpose.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. A convertible utensil of the character stated, comprising a container, a removable cover therefor, a wire frame positioned within said container, said wire frame being reversible and being adapted to form a basket for receiving dishes and the like when in the upright position and to form a support for cooking utensils when in the inverted position, and a convex false bottom positioned below said frame and provided with outer peripheral recesses and with upwardly extending nipples.

2. A convertible utensil of the character stated, comprising a container, a removable cover therefor, a false bottom for said container, a wire frame adapted to be positioned within said container, said wire frame being reversible and being adapted to form a basket for receiving dishes and the like when in the upright position and to form a support for cooking utensils when in the inverted position, upright handles hinged at their lower portions to said frame, and a horizontal positioning frame having hooked arms adapted to engage said handles.

3. A convertible utensil of the character stated, comprising a container, a removable cover therefor, a false bottom for said container, a lower wire frame adapted to be positioned within said container, said wire frame being reversible and being adapted to form a basket for receiving dishes and the like when in the upright position and to form a support for cooking utensils when in the inverted position, upright handles hinged at their lower portions to said frame, and an upper wire frame comprising hooked deflected arms adapted to engage said handles and bulged spring arms arranged at a right angle to said hooked arms, said deflected and bulged arms being adapted to engage and retain the upper portion of the cooking utensils positioned upon said lower frame when the latter is in inverted position.

4. A convertible utensil of the character stated, comprising a container, a removable cover therefor, a wire frame positioned within said container, said wire frame being reversible and being adapted to form a basket for receiving dishes and the like when in the upright position and to form a support for cooking utensils when in the inverted position, and a convex false bottom positioned below said frame and provided with outer peripheral recesses and upwardly extending nipples, upright handles hinged at their lower portions to said frame, and a can positioning frame having hooked arms adapted to engage said handles, and can positioning arms arranged at a right angle to said hooked arms.

5. In a boiler, a false convex bottom having peripheral recesses and short upwardly projecting nipples, upright retaining rods having their lower ends fast to said bottom and their upper ends deflected, and eyes attached to the upper inner wall of said boiler and engaging said deflected upper ends.

6. A convertible utensil of the character stated, comprising a container, a removable cover therefor, a false bottom for said container, vertical retaining rods secured at their lower ends to said bottom and having upper deflected ends, eyes carried by the upper inner wall of said container adapted to engage said deflected ends, a wire frame adapted to be positioned within said container, said wire frame being reversible and being adapted to form a basket for receiving dishes and the like when in the upright position and to form a support for cooking utensils when in the inverted position, upright handles hinged at their lower portions to said frame, and a horizontal positioning frame having hooked arms adapted to engage said handles.

7. A convertible utensil of the character stated, comprising a container, a removable cover therefor, a false bottom for said container, vertical retaining rods secured at their lower ends to said bottom and having upper deflected ends, eyes carried by the upper inner wall of said container adapted to engage said deflected ends, a lower wire frame adapted to be positioned within said container, said wire frame being reversible and being adapted to form a basket for receiving dishes and the like when in the upright position and to form a support for cooking utensils when in the inverted position, upright handles hinged at their lower portions to said frame, an upper wire frame comprising hooked deflected arms adapted to engage said handles, and bulged spring arms arranged at a right angle to said hooked arms, said deflected and bulged arms being adapted to engage and retain the upper portions of the cooking utensils positioned upon said lower frame when the latter is in inverted position.

CLAIR R. FAGLEY.